May 29, 1934.  P. GANGLER  1,960,903
MACHINE FOR WRAPPING UP ORANGE LIKE ARTICLES
Filed Nov. 12, 1932  6 Sheets-Sheet 1

Paul Gangler
INVENTOR
By
his Attorney.

Figure 1:
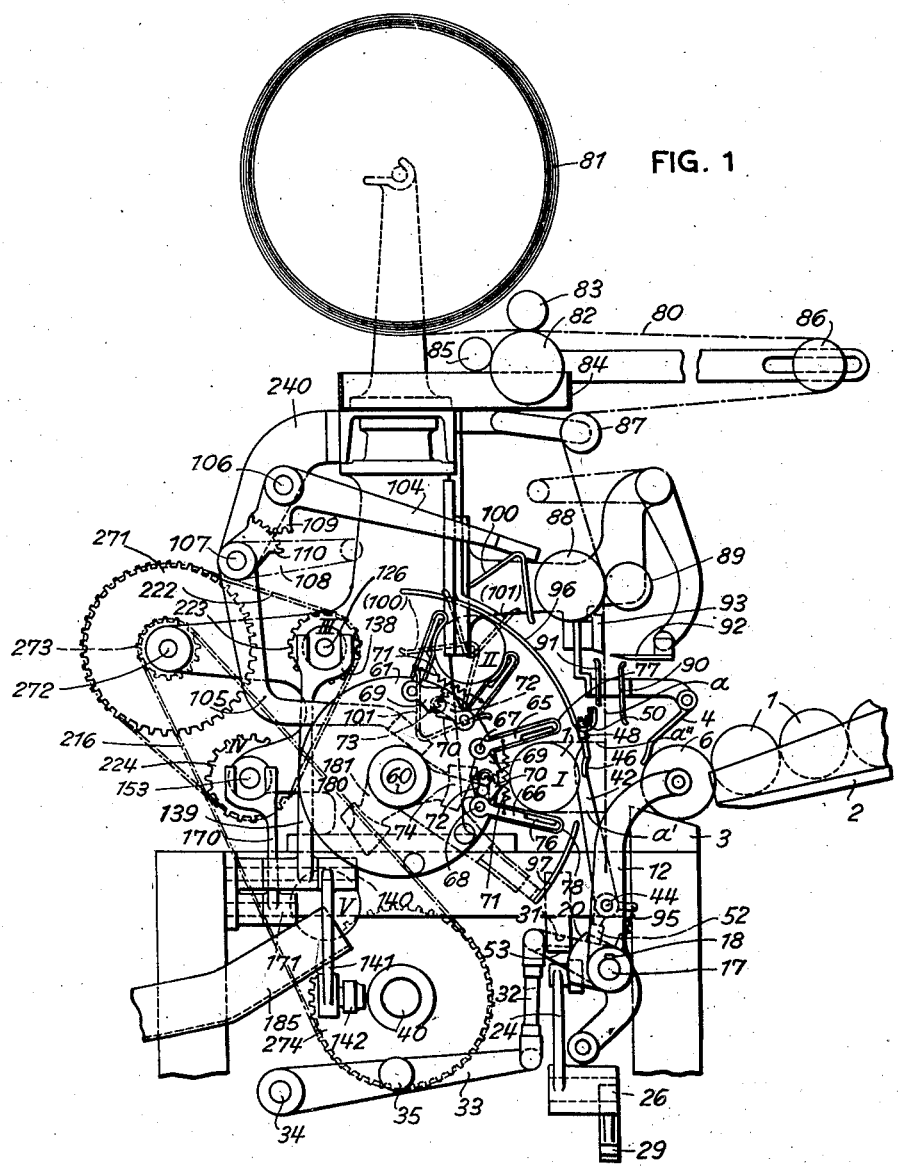

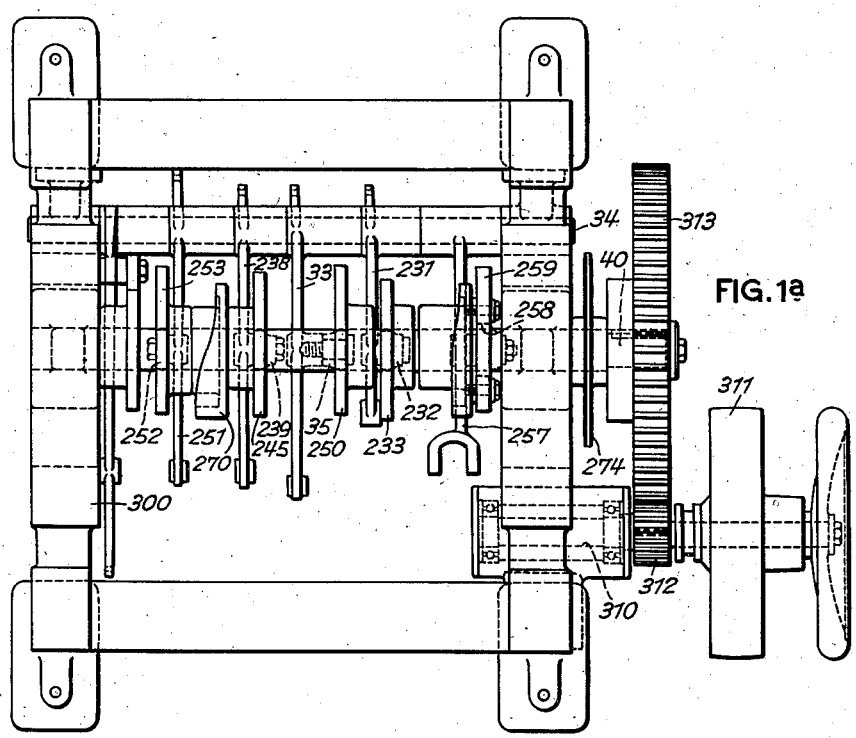
FIG.1ª
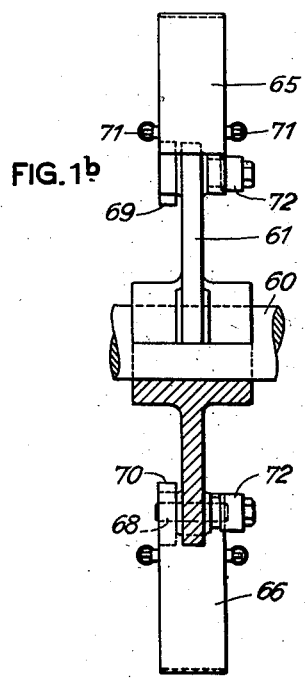
FIG.1ᵇ
Paul Gangler
INVENTOR

May 29, 1934. P. GANGLER 1,960,903
MACHINE FOR WRAPPING UP ORANGE LIKE ARTICLES
Filed Nov. 12, 1932 6 Sheets-Sheet 3
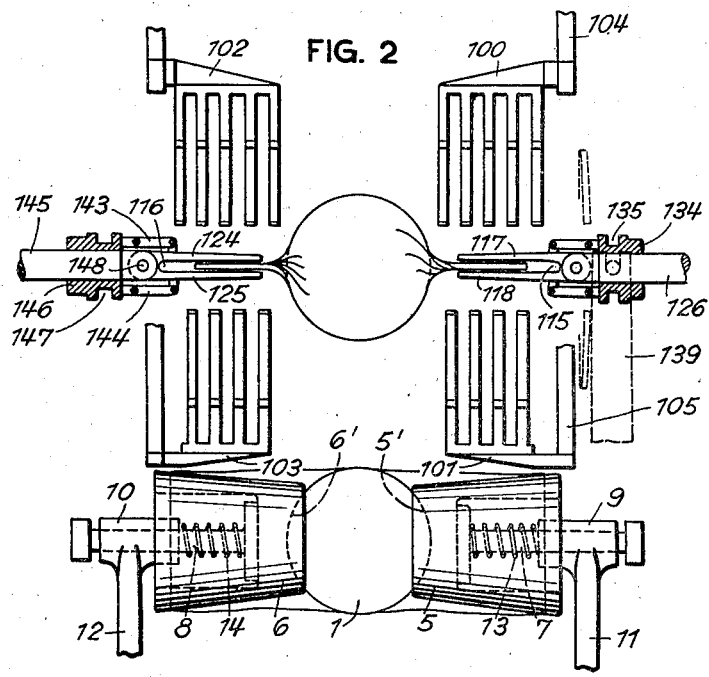
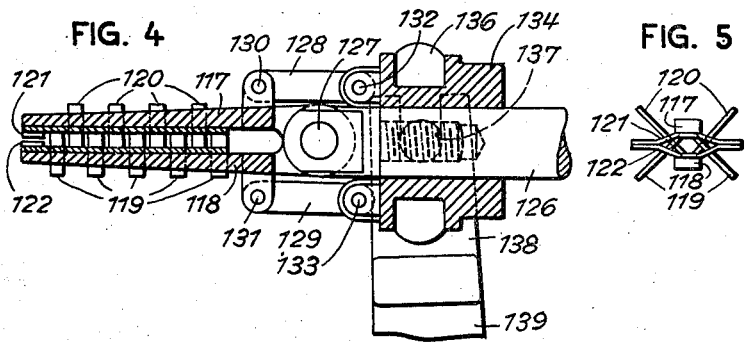
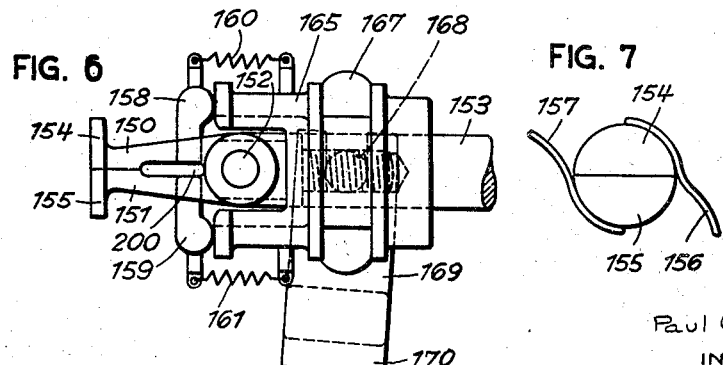
Paul Gangler
INVENTOR
his Attorney May 29, 1934.　　　　P. GANGLER　　　　1,960,903
MACHINE FOR WRAPPING UP ORANGE LIKE ARTICLES
Filed Nov. 12, 1932　　　6 Sheets-Sheet 4

Paul Gangler
INVENTOR
By [signature]
his Attorney.

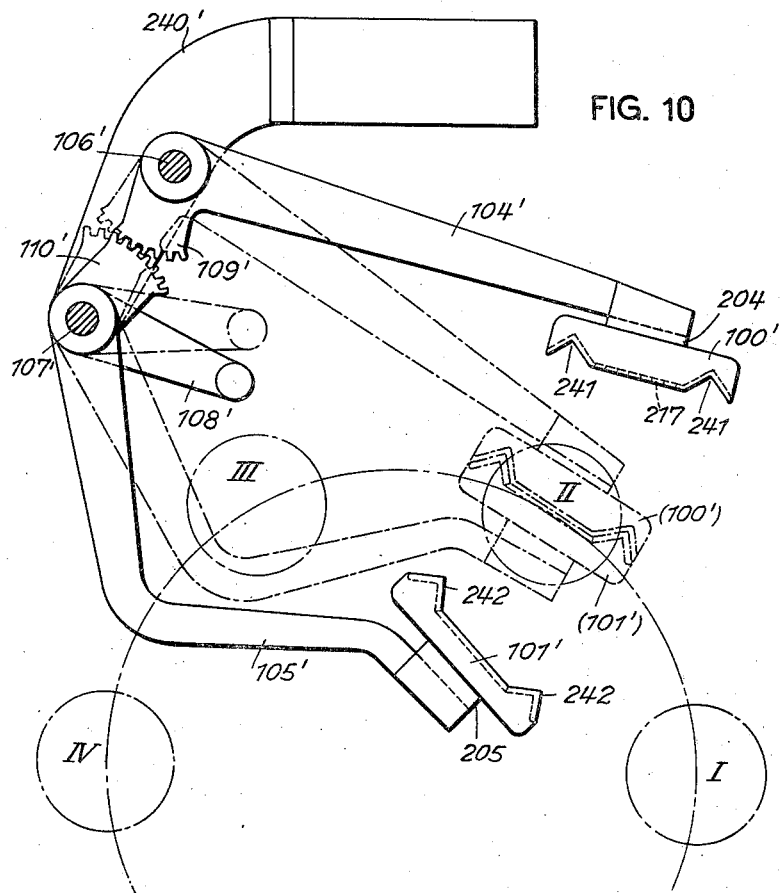
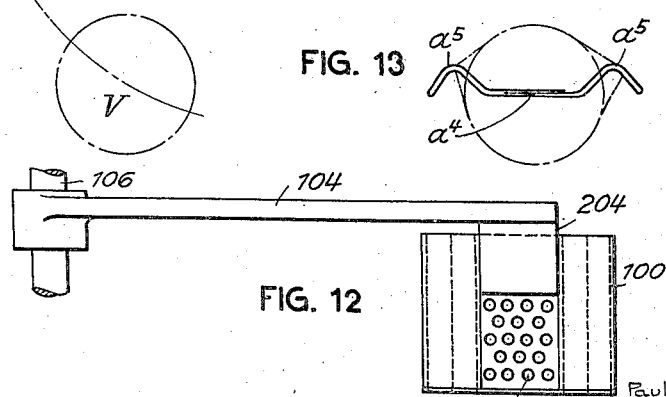

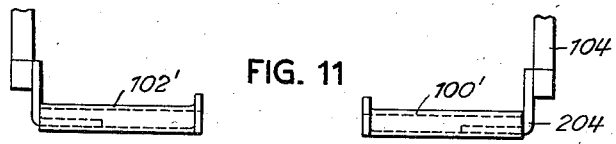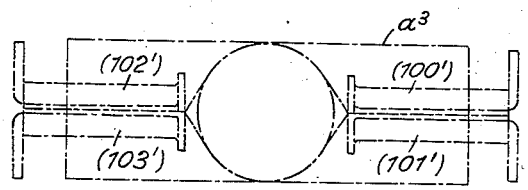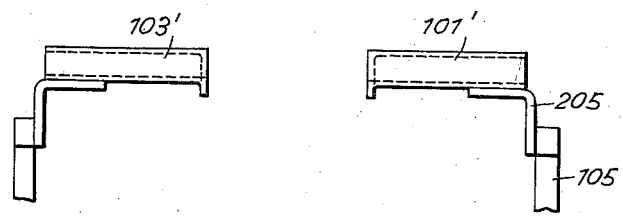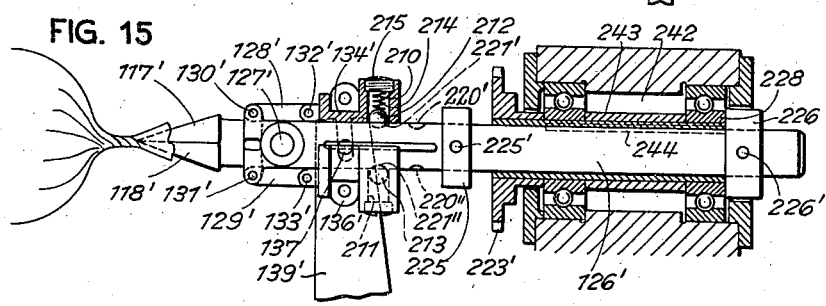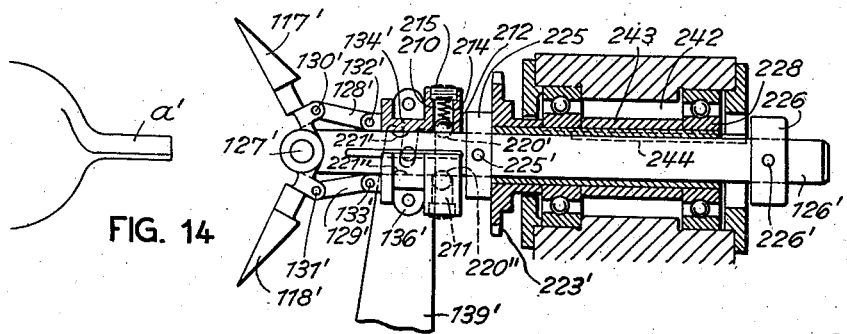

Patented May 29, 1934

1,960,903

UNITED STATES PATENT OFFICE 1,960,903

MACHINE FOR WRAPPING UP ORANGE-LIKE ARTICLES

Paul Gangler, Esslingen, Germany, assignor to firm Fr. Hesser, Maschinenfabrik-Aktiengesellschaft, Stuttgart-Cannstatt, Germany Application November 12, 1932, Serial No. 642,375
In Germany June 4, 1932

15 Claims. (Cl. 93—5)

My invention relates to machines for wrapping oranges, lemons, apples and similarly shaped fruit or articles in a paper wrapper. According to the invention, means are provided to fold a sheet of paper or similar material into tubular form about the article to be wrapped, which sheet may be cut off to a certain length from a web and previously moistened to a suitable extent and, if desired, dried again slightly, whereupon the laterally projecting portions of the tubular wrapper are folded or pressed down along the longitudinal axis of the tube, and the two folded or pressed portions are twisted together as well as spirally wound. An essential advantage of the invention resides in the fact that the wrapping paper made pliable by the damping may easily be twisted without tearing and the twisted or plaited ends then wound into a spiral so that after being dried the two twisted parts of the wrapper retain their shape and thus safely protect the wrapped up article, for instance an orange, from soiling and other injurious external influences.

A machine embodying my invention is illustrated in the accompanying drawings.

Figure 3:
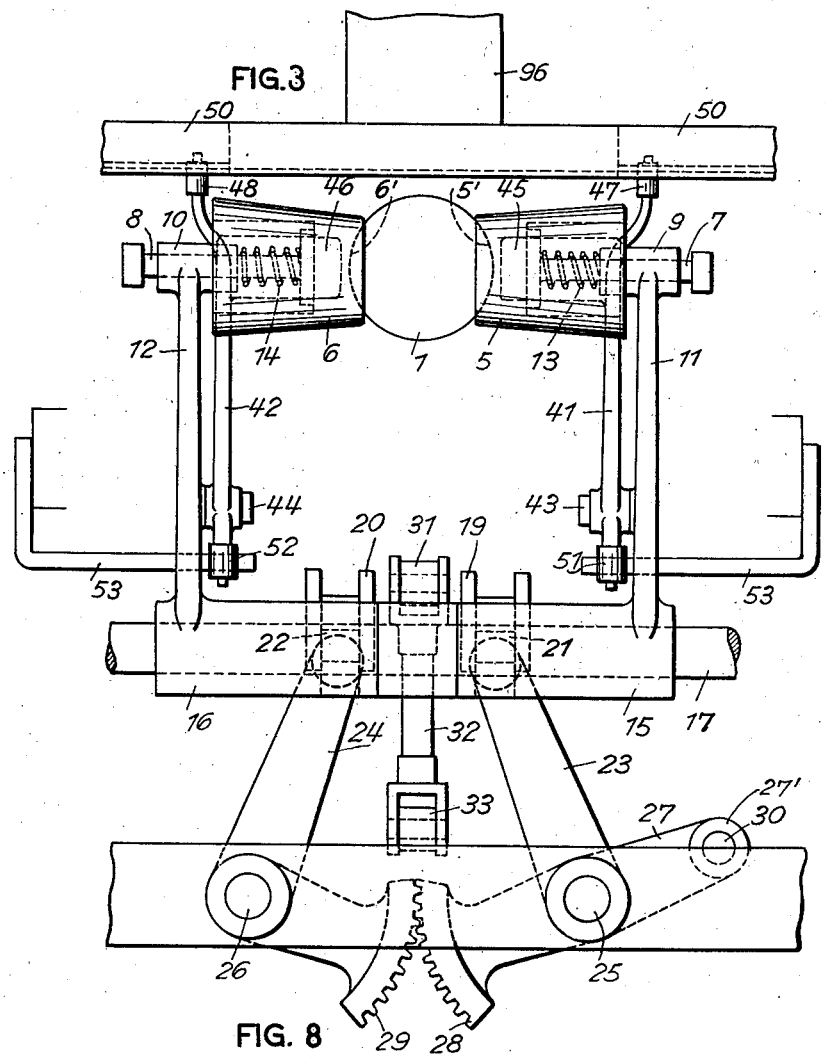
Figure 8:
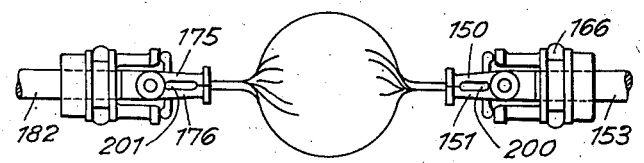
Figure 9:
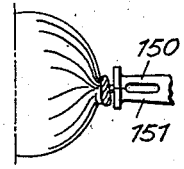

Fig. 1 represents the machine diagrammatically in side-elevation,

Fig. 1a shows a plan of the base plate of the machine and of levers for operating the various mechanisms of the same, Fig. 1b shows, in front-elevation, the conveyor wheel of the feeding mechanism of the machine, Figs. 2 and 3 show other parts of the machine in front elevation, Figs. 4 and 5 show twisting tongs of the machine in longitudinal section and front elevation, respectively, Figs. 6 and 7 illustrate other twisting tongs in side and front elevation, respectively, Fig. 8 shows a pair of twisting tongs of the latter kind in the operative position, Fig. 9 shows one of these tongs in the position it assumes after having wound the end portion of a wrapper, Fig. 10 is a side-elevation of another embodiment of the means for pressing the ends of the tubular wrapper, Fig. 11 is a fragmentary front-elevation of the structure of Fig. 10, Fig. 12 is a plan view of a part of Fig. 10, Fig. 13 is a front-elevation of the tubular wrapper with its end portion pressed together, Figs. 14 and 15 are sectional side-elevations of a modified construction of the twisting tongs, in Fig. 14 in the opened and in Fig. 15 in the closed position.

The articles to be wrapped, such as oranges 1, roll, for instance on a downwardly inclined trough or gutter 2 of any appropriate construction, to the machine on to a suitable rest or support 3, a suitable swinging braking arm 4 being provided and acted upon by a spring so as to yieldingly stop the articles in the appropriate position. Two gripping members 5 and 6 arranged and operated to be moved to and fro with respect to each other as well as to be oscillated or otherwise reciprocated between the said rest or support 3 and the feeding or conveyor mechanism of the machine, are adapted to seize the article which has reached the said support 3 and to convey it into the said feeding mechanism of the wrapping machine.

The two grippers 5 and 6 consist preferably of blocks of wood or other suitable material said blocks being provided with suitable cavities 5' and 6' at their opposite front faces and having the shape of truncated cones of such a cross-section that the diameter of the cone at its outer end substantially corresponds to or slightly exceeds the diameter of the article to be wrapped.

In the form of device illustrated, the grippers 5 and 6 are slidably guided upon bolts 7 and 8 which are secured in bearing sleeves 9 and 10 of levers 11 and 12, springs 13, 14 coiled around the said bolts 7, 8 ensuring a resilient gripping of the article to be wrapped by the grippers 5 and 6. The levers 11, 12 are provided with sleeves 15, 16 longitudinally slidable upon a shaft 17 but locked against rotation on this shaft by a suitable key 18, Fig. 1. The sleeves 15, 16 are provided with suitable slotted members 19, 20 engaged by blocks 21, 22 pivoted to the ends of levers 23, 24 fixed on bolts 25, 26 which are suitably journaled in bearings of the machine frame. Upon the bolt 25 is also fixed a double-armed lever 27 provided with a toothed segment 28 meshing with a toothed segment 29 carried by the other bolt 26. In order to impart a reciprocating movement to the grippers, the said lever 27 is connected by a suitable connecting rod (not shown) pivoted to the eye 30 of the lever 27 with the forked free end of the operating lever 257, (see Fig. 1a) which is journaled on a shaft 34 mounted in eyes of the base plate 300. The lever 257 is provided with an anti-friction roll 258 which is held by a suitable spring (not shown) in operative contact with an eccentric 259 of the driving shaft 40.

A continuous rotation is imparted to the said driving shaft 40 by a gear 313 meshing with the gear 312 of the first motion shaft 310 which is driven by means of a pulley 311 mounted thereon.

In order to also impart a common swinging movement to the said gripping members 5 and 6, there is keyed to the said shaft 17, which is journaled in suitable bearings of the machine frame, a lever 31, (Figs. 1 and 3), which is connected by a rod 32 to an operating lever 33. Said lever 33 is rotatably mounted on the said shaft 34, and is provided with an anti-friction roller 35 held by a suitable spring (not shown) in operative contact with the periphery of the eccentric 250 keyed to the driving shaft 40. By this means, the gripping members 5, 6 are adapted to be swung, at predetermined times, from their outer position shown in Fig. 1 into their inner position, and vice versa.

On pins 43, 44 secured to the levers 11, 12, there are journaled levers 41 and 42 the upper ends of which are provided with plates 45, 46 which are adapted to be pressed by suitable springs 95 against the circumference of the said two gripping members 5, 6. In the swung out or outward position of the levers 11, 12 illustrated in Fig. 1, vertical rollers 47, 48 journaled on the upper ends of the levers 41, 42, are held by said springs 95 in contact with a rail 50 and keep the said levers 41, 42 in the position shown in Fig. 1, against the tendency of the springs 95. Said rail 50 is secured to a stationary curved rail 96 the purpose of which will be hereinafter described. Other vertical rollers 51, 52 are journaled on the lower ends of the levers 41, 42 and adapted to come into contact with the rail pieces 53, during the inward movement or oscillation of the said levers 11, 12, before the levers 11, 12 reach their extreme inner position. The rail pieces 53 are secured to the machine frame as is indicated in Fig. 3.

The feeding or conveyor device for the wrapping machine, illustrated in the drawing comprises a rotary disc 61 fixed on a shaft 60 which is journaled in suitable bearings of the machine frame and rotated intermittently from the shaft 40 by a suitable and well known operating mechanism, (not shown) such for example as the well known maltese cross drive generally customary in the art for such purpose. The periphery of said disc 61 is provided with a suitable number of pairs of grippers, for example six pairs, two pairs only being shown in Fig. 1. Each pair of grippers consists of the gripper jaws 65, 66 which are pivoted to the disc 61, by means of pins 67, 68, and coupled with each other by toothed and meshing segments 69, 70 so that they are adapted to be rocked towards and away from each other. Tension springs 71 secured between the jaws 65, 66 tend to draw the jaws of a pair towards each other as shown at station II in Fig. 1. The jaw 66 is also provided with a lever 72 the free end of which carries an anti-friction roller 73 designed to be engaged by a suitable cam member 74 upon the said shaft 60 whereby the lever 72 is rocked to open the gripper jaws.

The pairs of grippers 65, 66 are provided at their inner opposite faces with suitable recesses or depressions 75, 76 and are preferably enclosed by suitable covers 77, 78 consisting of an elastic or yielding material (such as rubber or suitable textile fabric).

The wrapping paper is fed to the wrapping machine in the form of a paper web which is withdrawn from a storage reel 81 by means of a conveying device of any known or suitable construction, for instance consisting of two feed rollers 82, 83. The lower feed roller 82 is rotated by suitable means and dips into a tank 84 containing a liquid, such as water, which is picked up by said roller 82 during its rotation and transferred to the web of paper 80, so that by cooperation with the upper presser-roller 83 a thorough moistening of the web takes place. The presser-roller 83 is journaled in swinging lever arms (not shown) and pressed by suitable spring means (not shown) against the damping roller 82 as is also well known and customary in the art. An adjustable roller 85 acting against the roller 82 is adapted to regulate the quantity of liquid to be applied to the web 80.

The web 80, after having been moistened, is led to a feed device 88, 89, along a comparatively long path over the guide rollers 86, 87. The web thus has an opportunity to absorb the liquid applied to it as uniformly as possible and to expand, while during its further travel up to the point of introduction of the articles to be wrapped into the feeding device of the machine a preliminary drying is obtained, so that the paper attains the best pliability and resiliency desired for the wrapping process. The two feeding rollers 88, 89 are intermittently rotated in any well known and therefore not illustrated manner, and feed the length of paper $a$ needed for each wrapper between the guide rails 90, 91, fixed to the machine frame, downwards in front of the station I where the article to be wrapped is introduced into the machine. A movable knife blade 92 cooperates with a stationary counter-blade 93 fixed to the machine frame to sever the paper to the desired length in customary manner. The described conveying, moistening and severing means for the web of paper are well known in this art and for machines of the present kind so that they need no further detailed description and illustration. In the position shown in Fig. 1, the grippers 5, 6 have approached each other so as to grip the orange resting upon the support 3, (see Fig. 3), and are now swung inwards by operating mechanism described above into the position I by suitable movement of the parts 31, 32, 33. As soon as the grippers reach the press-plates 45, 46 of the levers 41, 42, the paper web is clamped by these press-plates 45, 46 against the periphery of the grippers 5, 6 and simultaneously cut off to the desired length $a$ by the cutting device 92, 93. The press-plates 45, 46 now swing inwards together with the grippers 5, 6, until the orange is conveyed between the open gripper jaws 65, 66 at station I of the machine, the severed paper sheet $a$ encircling thus in a U-shape the orange and the conical surfaces of the grippers 5, 6. The cam member 74 is now swung out of contact with the roller 73 and thus releases this roller, so that, due to the pull of the springs 71, the grippers 65, 66 are able to close and hold the orange by means of their elastic coverings 77, 78. Directly afterwards, a folding slide 97 adapted to be rocked on the shaft 60 is turned upwards and folds the lower projecting end or edge portion $a'$ of the wrapper upwards around the front portion of the orange and the front peripheries of the grippers 5, 6. The slide 97 is secured to a lever 235 which is journaled on the shaft 60 and connected by a connecting rod of well known construction to the free end of an operating lever 238. This lever is journaled on the shaft 234 and has an anti-friction roller 239 by a suitable spring (not shown) in operative contact with the eccentric 245 of the shaft 40.

Immediately before the completion of the inward motion of the grippers 5, 6 into the position I, the rollers 51, 52 of the levers 41, 42 have encountered the fixed rail pieces 53 and have, thereby, imparted to the levers 41, 42 an additional movement inwardly so that the press-plates 45, 46 have been moved out of their clamping engagement with the grippers 5, 6. The tapered periphery of the roll-like grippers 5, 6 is of particular importance for the reason that it is possible thereby to form the tubular envelope with the ends projecting to a considerable extent at both sides, so that, by a uniform application of the wrapping paper along the total length of the tube, a properly shaped tube will be formed.

Immediately after the upward movement of the said folding slide 97 has been finished, the grippers 5, 6 are moved outwards away from the orange by a suitable movement of their operating mechanism, the clamping levers 41, 42 with their rollers 51, 52 sliding along the rails 53 so that a clamping action is prevented. The grippers 5 and 6 are then swung back into their initial position shown in Fig. 1, for the purpose of gripping the next orange 1, while the conveyor disc 61 is advanced a step, the upper projecting end $a''$ of the wrapper sliding along the above mentioned stationary guide rail 96 fixed to the machine frame, and being thus folded over the end $a'$ first folded down.

At the station II, the open lateral ends of the tubular wrapper projecting at either side beyond the orange are pressed together. For this purpose, there are provided at station II two pairs of angularly shaped comb-like folding members 100, 101 and 102, 103. The individual prongs of the cooperating members of each pair are displaced in relation to one another so that when approaching each other, the prongs of one member enter between the prongs of the complemental member. The pair of combs 100, 101 is fixed on levers 104, 105 pivotally mounted by means of the pins 106, 107, on which they are secured, in suitable bearings of a bracket 240 which is secured to the machine frame. On the pin 107, there is also fixed a lever 108 which is moved in such a manner that both levers 104, 105 are oscillated by means of meshing toothed segments 109, 110 likewise fixed upon the said pins 106, 107. The said lever 108 is linked by a connecting rod (not shown) to an operating lever 251 which carries an anti-friction roller 252 held by a suitable spring (not shown) in operative contact with an eccentric 253 of the driving shaft 40. A similar operating mechanism is provided for the other pair of combs 102, 103.

During the inward motion of the pairs of combs from their outer inoperative position into their inner operative position shown in broken lines at (100), (101) in Fig. 1 for the pair of rakes 100, 101, the end portions of the wrapper projecting beyond the orange are engaged by the pairs of combs 100, 101, and 102, 103 and pressed or folded together up to the center line of the wrapper tube. This compression facilitates the subsequent twisting operation by the twisting tongs hereinafter described so that these tongs are able to get a good grip on the compressed or gathered end portions of the paper tube. After this work of compressing the ends of the wrapper is finished, the pairs of combs 100, 101, and 102, 103 swing outwards again, and the conveyor wheel 61 is advanced a further step so as to convey the orange to the station III.

At this station, there are arranged twisting tongs 115 and 116, Fig. 2, the legs of which 117, 118 and 124, 125, respectively, are of a particular and useful construction. As shown in Figs. 4 and 5 for the tongs 115, both legs 117, 118 are provided with a plurality of angular prongs 119, 120 which are spaced along the length of the said legs and, like the hereinbefore described pairs of rakes 100, 101 or 102, 103 the prongs of one series are adapted to engage between the prongs of the other series in the closed position shown in Fig. 5. At the front ends, there are secured to the two legs of the tongs two strips 121, 122 of metal or the like, which are bent or otherwise formed in such a way that, when the tongs are closed as shown in Fig. 5, they will form together a sort of a flattened hexagon with lateral abutment faces. Both legs 117, 118 of the tongs are pivotally mounted upon a pin 127 secured to the driving shaft 126. Hinged members 128, 129 engage, by means of the pins 130, 131, eyes on the tong legs and are also pivotally connected by pins 132, 133 with a slideable sleeve 134 which is prevented from rotating on the shaft 126 by the well known means of a longitudinal key fixed in a slot of the shaft and engaging a slot in the sleeve. The annular groove 135 of the slideable sleeve 134 is rotatably encircled by a ring 136, which is provided with oppositely projecting trunnions 137 engaged by the forked end 138 of a lever 139. This lever is, as shown in Fig. 1, mounted on the pin 140 which is journaled in a suitable bearing of the machine frame and upon which is mounted an operating lever 141 having an anti-friction roller 142 which bears sideways against a cam cylinder 270 keyed to the driving shaft 40. The shaft 126 is rotated by means of a chain gearing comprising the chain 222 and the sprocket wheels 221, 223 and 224. The wheel 221 is secured to a shaft 220 to which rotation is imparted by a chain gearing comprising the chain 216 and the sprocket wheels 217 and 215, the latter wheel being secured to the driving shaft 40. The shaft 145 of the tongs 116 is rotated from the shaft 220 by a chain gearing corresponding to the described chain gearing for the shaft 126.

The legs 124, 125 of the tongs 116 are likewise equipped with angular prongs corresponding to the prongs 119, 120, 121, 122 and adapted to be swung around a pin 148 on the rotating shaft 145. For this purpose, there are provided hinged members 143, 144, Fig. 2, which at one end engage the legs 124, 125 of the tongs 116 and, at the other end, are connected to a sleeve 146 which is slidably but not rotatably mounted upon the driving shaft 145 and the annular groove 147 of which is likewise engaged by a ring (such as the ring 136) whose lateral trunnions are connected with a similar driving linkwork as described with reference to the tongs 115.

When the orange has arrived at the station III, the two tongs 116 and 117 are moved uniformly inwardly from their outward and opened position through the agency of their described driving mechanisms, a quick rotation being simultaneously imparted to the driving shafts 126, 145, so that when both tongs are gradually closed, they rotate synchronously and their prongs 119, 120, 121, 122 have gradually engaged the projecting ends of the tubular envelope which had been only roughly compressed as shown in Fig. 5 by the prongs of the pairs of combs 100, 101 and 102, 103, and that during the final closure of the tongs they hold said projecting ends between themselves in such a manner that a repeated twisting of the ends can be carried out efficiently, and a cord-like structure of the two ends is produced. The special construction of the front end of the tongs in form of the strips 121, 122 serves to bring the twisted portions as far as possible to the central line of the envelope and to prevent tearing at the base of these portions. The tongs are then opened again and returned into the outer initial position.

Now the orange is brought by the feeding mechanism to the station IV where the twisted ends of the envelope are converted from their substantially straight condition into a spiral condition and laid flat against the outer periphery of the wrapping. For this purpose, there are provided tongs 200, 201, Fig. 8, which are operated in a similar manner to the tongs at the station III.

As shown in Fig. 6, the legs 150, 151 of the tongs 200 are adapted to be swung together around a pin 152 provided at the end of the driving shaft 153 and their front faces are provided with semi-circular press-faces 154, 155 which, as illustrated in Fig. 7, in their closed state form a complete circle. Furthermore, there are secured to the peripheries of the front faces 154, 155 arms 156, 157 which are bent to extend outwards. The tong legs 150, 151 are provided with vertical arms 158, 159 which are adapted to come in contact with the front face of a slidable sleeve 165 under the action of springs 160, 161, which are secured between said arms 158, 159 and the said slidable sleeve 165. An annular groove 166 provided on the sleeve 165 is engaged by a ring 167 provided with oppositely projecting trunnions 168 engaged by the forked end 169 of the operating lever 170. This lever is mounted upon a pin 171, Fig. 1, and is operated by a suitable eccentric keyed to the driving shaft 40, in a similar manner to that described hereinbefore with reference to the tongs 115 and 116. The opposite tongs 201 consist in like manner of the legs 175, 176 pivoted on the driving shaft 182 and are operated by a drive similar to that described with reference to the tongs 200. The rotation of the shaft 153 is effected by means of the above mentioned sprocket wheel 224, and the rotation of the shaft 182 is effected in a similar way.

On the arrival of the orange with the two laterally extending twisted ends of the wrapping at station IV, both tongs 200 and 201 are moved inwardly from their opened outside position into the position shown in Fig. 8 and at the same time rotated by their shafts 153 and 182 so that at first, by the pairs of lateral curved arms 156, 157, (Fig. 7), the twisted ends of the wrapping, if deflected from the straight central line, are engaged and brought back to the central line, whereupon the tongs are closed and lay hold of the twisted ends and are moved inwards into the position shown in Fig. 9, while a turning motion is imparted to them, so that the two twisted ends are curled up into a spiral and laid or pressed closely against the surface of the orange. This completes the wrapping process.

The tongs 200, 201 then open again, and the wrapped up orange is fed forward to the station V, where is provided a similar cam member 180 as the cam member 74 mentioned before, with which it is connected by means of a double-armed lever 181 adapted to be rocked upon the shaft 60. At the same rhythm as the cam member 74 slides along the roller 73 and thus closes a pair of grippers 65, 66 at station I, the cam member 180 thus passes along the roller 73 of the corresponding pair of grippers at the station V and opens the gripper jaw, so that the wrapped orange is released and free to pass along the chute 185 to a suitable storage receptacle. The said double-armed lever 181 is linked by a suitable and known connecting rod, not shown, to an operating lever 231 which is journaled on the shaft 34 and has an anti-friction roller 232, held by a suitable spring not shown, in operative contact with an eccentric 233 of the driving shaft 40.

The construction illustrated in Figs. 10—15 of the drawings differs from the machine described above with respect to the appliances at the stations II and III by which the ends of the wrapper laid around the orange in the shape of a tube and projecting at both sides are pressed together along the longitudinal axis of the tube and the two pressed ends are twisted together.

In the modification shown in Figs. 10 to 13, two pairs of press-jaw like members 100', 101', and 102', 103' serve at station II, instead of the angular pairs of combs 100, 101 and 102, 103 above described, for pressing together the projecting ends of the tubular wrapping $a^3$, Fig. 1. As illustrated in Fig. 10, the pressing or shaping jaws 100' and 101' are, by means of angular member 204 and 205, secured to levers 104' and 105' which correspond to the levers 104 and 105 for the above mentioned pair of combs 100, 101. The levers 104' and 105' are by means of pins 106' and 107', on which they are secured, journaled in a bracket 240' (corresponding to the bracket 240 in Fig. 1) and are coupled with each other by toothed segments 109', 110' so as to swing inwards and outwards in unison. On the pin 107' is also secured a lever arm 108' which corresponds to the lever arm 108 of the first described construction and is operated in the same way. A similar drive is provided for the pair of press-jaws 102', 103'. In each pair of press or moulding jaws, the pressing surface of one press jaw is provided along the two edges extending parallel to the axis of the tubular wrapper $a^3$ with angular or similar grooves or channels 241 and the other press-jaw is provided with corresponding wedge-like or similar ribs or projections 242. As shown in Fig. 13, the pairs of press-jaws 100', 101' and 102', 103', when moved by their operating mechanism from their open position into their closed position indicated in dotted lines at (100'), (101') and (102'), (103') in Figs. 10 and 11, operate in such a manner that they press the projecting ends of the tubular wrapper $a^3$ flat together and at the same time produce in the edges of the ends $a^4$ angular bends or folds $a^5$, as shown in Fig. 13, due to the cooperation of the press or moulding faces. Increased stiffness and definite direction is in this way imparted to the pressed ends $a^4$ of the tubular wrapper, so that at the following station III they may surely and uniformly be engaged by the twisting tongs and a uniform twisting of the ends is ensured. The press-jaws are preferably provided with perforations 217 shown in Figs. 10 and 12, which have the advantage that during the pressing of the tube ends $a^4$ the air contained in the folds of the paper may easily escape through the said perforations 217, so that the two flattened end faces $a^4$ of the tube $a^3$ lie as tightly as possible on each other.

After the feed of the orange from station II to station III, the twisting of the ends $a^4$ of the paper tube by means of two twisting tongs takes place which corresponding to the twisting tongs 117, 118 and 124, 125 in Fig. 2 are arranged at station III at either side of the orange. But as shown in Figs. 14 and 15 for one twisting tong, there are employed for the twisting of the flatly compressed tube ends $a^4$ preferably twisting tongs the gripping ends of which form with each other a cone in the closed state, Fig. 15. The twisting tongs are first moved inwardly from their open outer position, in open condition, by their driving shafts and then, for the purpose of engaging the flatly compressed end part $a^4$ of the tubular wrapper, are closed while the twisting takes place simultaneously. The flat ends of the paper tube are thus wrapped around the outer conical faces of the closed tongs. After the twisting is finished, the tongs are first moved backwards a certain distance without being opened, whereupon the opening of the tongs occurs.

In Figs. 14 and 15 is illustrated the construction and mode of operation of one twisting tong, the construction and mode of operation of the other tong being the same. The twisting tong has its driving shaft 126' journaled in a ball-bearing 242 of the usual construction by means of a sleeve 243 upon which is fixed a sprocket wheel 223' corresponding to the sprocket wheel 223 of the first described embodiment for rotating the shaft 126 and in which the shaft 126' is supported for sliding but not for turning, as a relative rotation between the sleeve 243 and the shaft 126' is prevented by a longitudinal key 244 secured in a groove of the shaft 126' and adapted to slide in a longitudinal groove of the sleeve 242. Longitudinal reciprocation of the shaft 126' is effected, as in the first described embodiment of the twisting tongs, by means of a lever 139', which by means of a ring 136' engages a sleeve 134' arranged to slide but not to rotate on the shaft 126' and corresponding to the slidable sleeve 134 of Fig. 4, and which is moved in like manner and by a similar driving gear as described above for the operating lever 139. The rear flange of the sleeve 134' is provided with two radial bores 210, 211 containing balls 212, 213. Said balls are pressed inwardly against the periphery of the shaft 126' by spiral springs, such as shown at 214 for the ball 212. The said springs are locked in position by screws 215. The shaft 126' is furnished with two pairs of milled or otherwise produced notches 220', 220" and 221', 221" into which the balls 212, 213 may enter under the pressure of the said springs. The shaft 126' is, furthermore, provided with suitable abutment collars 225, 226 which are fixed by pins 225', 226' and adapted to come in contact with the driving sprocket 223' and the ring 228 of the ball bearing 242, respectively.

If the tong is moved inwardly from its opened outer position shown in Fig. 14 by the said driving lever 139', the balls 212, 213 rest in the recesses 220', 220" of the shaft 126', see Fig. 14, and consequently carry the shaft 126' along with them. As soon as the collar 226 encounters the said ring 228, however, the shaft 126' is retained. In consequence thereof, the balls 212, 213 are forced out of the notches 220', 220" during the further motion of the slideable sleeve 134', so that, for a while, they will roll upon the surface of the shaft 126' and then enter the notches 221', 221". Since the pivot 127' for the legs 117', 118' is secured to the shaft 126', the tong is simultaneously with this movement brought into its closing position by the links 128', 129' which at 130' and 131' and 132', 133' are pivotally secured to the said legs of the tongs and the sleeve 134', respectively, so that on completion of this movement, i. e. in the closed position, the tong is locked in closed position by the balls 212, 213 in cooperation with the rests 221', 221".

During the return motion of the sliding sleeve 134', the shaft 126' is, due to the balls 212, 213 being forced into the said rests 221', 221" carried along towards the rear, until the collar 225 comes in contact with the front face of the sprocket 223'. By a further rearward motion of the sleeve 134', the balls 212, 213 are lifted out of the notches 221', 221" roll a distance on the surface of the shaft 126', and drop finally into the rests 220', 220" the tongs being opened during this further rearward motion.

After the ends of the tubular wrapper have been twisted together in this way, the orange will be conveyed, as above described, first to the station IV and then to the station V, at which stations the ends twisted together in the manner described hereinbefore are spirally curled up against the periphery of the wrapping by the tongs 200, 201, Fig. 8, and then the finished wrapped up orange passes into the discharge trough or chute 185.

It will be readily understood that various other modifications may be made in the machine without departing from the spirit of my invention and the scope of the appended claims.

I claim as my invention:—

1. In a wrapping machine of the type specified, a plurality of operating stations, means comprising a plurality of U-shaped holders adapted to feed the article to be wrapped successively to said operating stations, means adapted to convey a wrapping sheet to one of said stations in front of a feed holder, resiliently mounted means adapted to grip an article and to introduce it together with said sheet into the holder, said latter means consisting of two gripping members arranged at either side of the path in which said articles are introduced into the holder, each gripping member being of truncated conical form with the diameter increasing from the inner face outwardly and operating means adapted to reciprocate said gripping members towards and from each other and to oscillate the two gripping members in unison parallel to said path.

2. In a wrapping machine of the type specified, means adapted to fold a wrapping sheet in a tube-like form around the article to be wrapped, means adapted to press together the projecting end portions of the tubular wrapper towards the longitudinal axis of the tube, and means adapted to twist the two pressed end portions, said pressing means consisting of two pairs of opposite angularly shaped rakes, the rakes of each pair being adapted to embrace the projecting end portions of the tubular wrapper and having their prongs displaced in relation to each other, and operating means adapted to move the two opposite rakes of each pair together until their prongs engage each other in the manner of fingers pressing the portions of the wrapper together in the center line of the wrapper tube.

3. In a wrapping machine of the type specified, means adapted to fold a wrapping sheet in a tube-like form around the article to be wrapped, means adapted to press together the projecting end portions of the tubular wrapper towards the longitudinal axis of the tube, and means adapted to twist the two pressed end portions, said twisting means consisting of two pairs of twisting tongs arranged to operate successively, the first pair of tongs being arranged and operated to twist the pressed end portions of the tubular wrapper, and the second pair of tongs being arranged and operated to curl the twisted ends spirally and to press them against the article.

4. In a wrapping machine of the type specified, means adapted to fold a wrapping sheet in a tube-like form around the article to be wrapped, means adapted to press together the projecting end portions of the tubular wrapper towards the longitudinal axis of the tube, and means separate from the pressing means and adapted to twist the two pressed end portions, said twisting means comprising a pair of tongs having a plurality of angularly shaped transverse fingers distributed over their length and adapted in the closing position of the two legs to have the prongs of one leg project between the prongs of the other leg.

5. Wrapping machine as specified in claim 4, in which the front ends of the legs of the tongs are provided with strips extending transversely of the longitudinal axis of the legs and shaped to form in the closed position of the tongs a wrapping frame of substantial hexagonal shape with lateral abutment surfaces.

6. In a wrapping machine of the type specified, means adapted to fold a wrapping sheet in a tube-like form around the article to be wrapped, means adapted to press together the projecting end portions of the tubular wrapper towards the longitudinal axis of the tube, and means adapted to twist the two pressed end portions, said twisting means comprising a pair of twisting tongs whose legs are shaped to form in their closed state a cone with each other, means adapted to rotate said tongs and to reciprocate the tongs from their outer inoperative position into their inner operative position, and means adapted to control the legs of the tongs so as to close the tongs only after having effected a certain distance of their inward motion and to re-open the tongs only after having effected a certain distance of their outward motion.

7. In a wrapping machine of the type specified, means adapted to fold a wrapping sheet in a tube-like form around the article to be wrapped, means adapted to press together the projecting end portions of the tubular wrapper towards the longitudinal axis of the tube, and means adapted to twist the two pressed end portions, said twisting means comprising a pair of twisting tongs pivoted on rotatable and slideable driving shafts, a sleeve mounted slidably but not rotatably on each shaft and connected with the legs of the tongs, operating means adapted to rotate said shafts and to reciprocate said sleeves on the shafts so as to advance and withdraw the tongs into and out of their operative position, and resilient coupling members adapted to couple said sleeve with the shaft in the withdrawn as well as in the advanced positions of the tongs, and means adapted to release automatically said couplings during the to and fro movements of the said sleeve only when the sleeve has moved the shaft a certain distance.

8. Wrapping machine according to claim 7, in which the resilient coupling is formed by balls arranged in radial bores of the slideable sleeve and adapted to be resiliently pressed against the driving shaft and in the withdrawn as well as in the advanced position of the tongs into correspondingly arranged recesses of the driving shaft for the purpose of coupling it with the slideable sleeve, and in which the shaft is provided with spaced abutments adapted to cooperate with spaced stationary stops so as to cause the said balls to escape from said notches during the displacement of the slideable sleeve opposite to the spring pressure and to release the coupling, if during the course of the longitudinal displacement of the shaft one of said abutments comes in contact with its cooperative stationary stop.

9. In a wrapping machine of the type specified, means adapted to fold a wrapping sheet in a tube-like form around the article to be wrapped, means adapted to press together the projecting end portions of the tubular wrapper towards the longitudinal axis of the tube, means adapted to twist the two pressed end portions, and means adapted to curl the twisted ends spirally, said curling means consisting of a pair of tongs the legs of which are at their front ends provided with semi-circular press-faces forming with each other in the closed state of the tongs circular faces adapted to press the curled ends of the wrapper against the article.

10. Wrapping machine as specified in claim 9, in which the semi-circular front faces of the tong legs are at their periphery provided with finger-like lateral extensions bent oppositely outwards and adapted to seize and lead to the center the twisted end portions of the wrapper.

11. In a wrapping machine of the type specified, means for folding a wrapping sheet in tubular form around the article to be wrapped, means adapted and operated to twist the two end portions of the wrapper and separate means adapted to press together the projecting end portions of the tubular wrapper towards the longitudinal axis of the tube prior to the operation of the said twisting means.

12. In a wrapping machine of the type specified, means for folding a wrapping sheet in tubular form around the article to be wrapped, means adapted and operated to twist the two end portions of the wrapper, separate means adapted to press together the projecting end portions of the tubular wrapper towards the longitudinal axis of the tube prior to the operation of the twisting means, and separate means adapted to curl the twisted ends spirally after the operation of the twisting means.

13. In a wrapping machine of the type specified, means adapted to fold a wrapping sheet in tubular form around the article to be wrapped, means adapted to press together the projecting end portions of the tubular wrapper towards the longitudinal axis of the tube, and separate means adapted and operated to twist the two pressed end portions, said pressing means consisting of two pairs of press jaws adapted to seize the projecting ends of the tubular wrapper, the pressing faces of the jaws of each pair being provided, near the edges extending axially to the tubular wrapper, with angular grooves on one jaw and correspondingly shaped ribs on the other jaw, and operating means adapted to move the press-jaw of each pair towards and from each other prior to the operation of the said twisting means.

14. Machine as specified in claim 13 in which one jaw at least of each pair of press jaws is provided with transverse openings leading outwardly from the press-face.

15. In a wrapping machine of the type specified, a plurality of operating stations, means comprising a plurality of U-shaped holders adapted to feed the articles to be wrapped successively to said stations, means adapted to convey a wrapping sheet to one of said stations in front of one of said holders, means for gripping an article and introducing it together with said sheet into said holder, said last named means comprising gripping members of truncated conical shape with the diameter increasing from the inner face outwardly and said gripping members arranged at either side of the path in which said articles are introduced into the holder, operating means for reciprocating the gripping members towards and from each other and for oscillating said gripping members in unison parallel to said path, and press plates adapted to cooperate with said gripping means during the introducing movement of the gripping members to press the wrapping sheet resiliently against the tapering surfaces of said members.

PAUL GANGLER.